United States Patent [19]

Von Kohorn

[11] Patent Number: 4,725,930

[45] Date of Patent: Feb. 16, 1988

[54] ILLUMINATED ROCK GARDEN

[76] Inventor: Henry Von Kohorn, 215 Rocky Rapids Rd., Stamford, Conn. 06903

[21] Appl. No.: 76,884

[22] Filed: Jul. 23, 1987

Related U.S. Application Data

[63] Continuation-in-part of Ser. No. 889,818, Jul. 24, 1986, Pat. No. 4,686,611, which is a continuation-in-part of Ser. No. 697,168, Feb. 1, 1985, Pat. No. 4,626,968, which is a continuation-in-part of Ser. No. 660,905, Oct. 15, 1984, Pat. No. 4,594,646.

[51] Int. Cl.$^4$ .............................................. F21P 1/02
[52] U.S. Cl. ..................................... 362/145; 362/805
[58] Field of Search .............. 362/805, 806, 122, 123, 362/97, 154, 311, 253, 145

[56] References Cited

U.S. PATENT DOCUMENTS

| | | | |
|---|---|---|---|
| 2,631,409 | 3/1953 | Windiate | 362/122 |
| 2,709,217 | 5/1955 | McCluskey | 362/122 |
| 2,723,341 | 11/1955 | Greenspan | 362/122 |
| 4,081,666 | 3/1978 | Roehrick | 362/806 |
| 4,349,864 | 9/1982 | Smith | 362/122 |

FOREIGN PATENT DOCUMENTS

| | | | |
|---|---|---|---|
| 33408 | 1/1964 | Fed. Rep. of Germany | 362/122 |
| 454604 | 10/1936 | United Kingdom | 362/122 |

*Primary Examiner*—Charles J. Myhre
*Assistant Examiner*—David A. Okonsky
*Attorney, Agent, or Firm*—Parmelee, Bollinger & Bramblett

[57] ABSTRACT

Glare-free illumination of three-dimensional objects in a rock garden setting is disclosed. Artificial light is generated in a void space in a man-made rock, below and in close proximity to the object to be illuminated, shielding the eyes of observers from a direct view of the light source. Light shines upwardly in the shape of an inverted light cone enveloping the object and is only indirectly visible by its reflections from the illuminated objects, such as plants, trees and sculptures. The minimal light path reduces scattering of light, power consumption and lamp size. A flexible and adjustable suspension system is disclosed, ensuring the horizontal position of the supports for the objects placed thereon, thereby ensuring the vertical position of the illuminated objects, irrespective of surface configuration of the simulated rock garden or the angle of the ground upon such multiple-rock garden may be placed.

14 Claims, 10 Drawing Figures

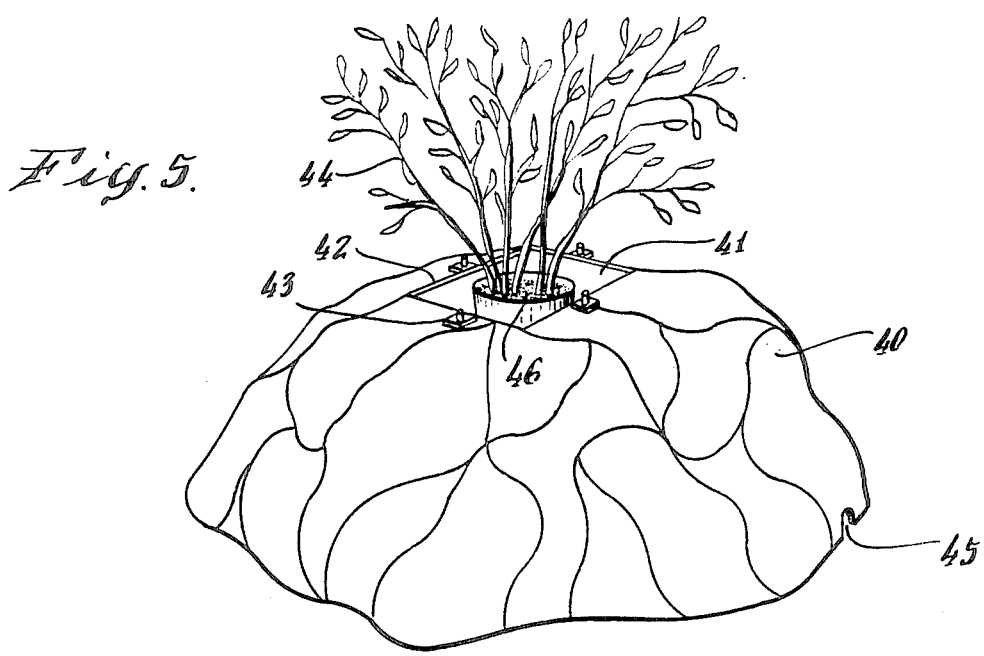
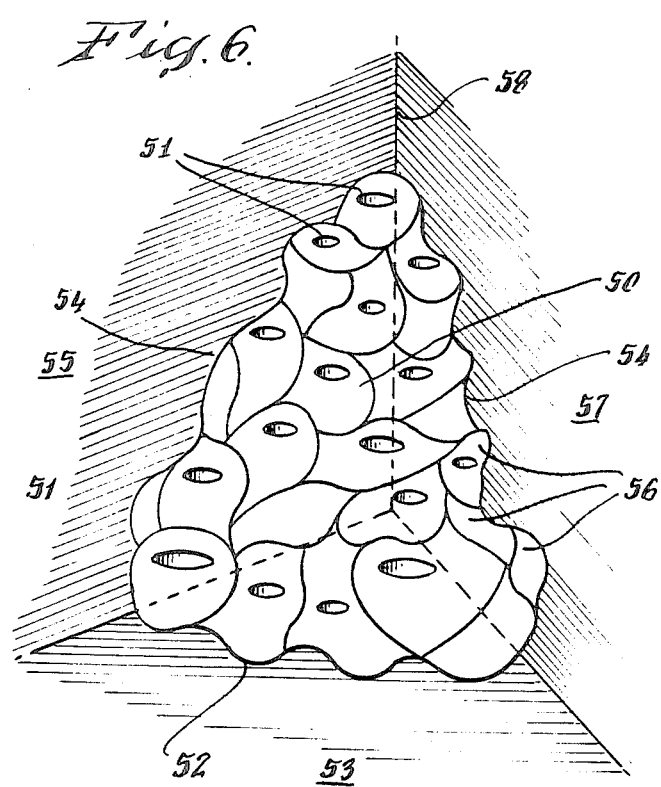
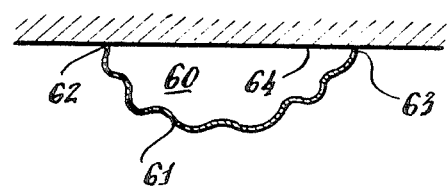
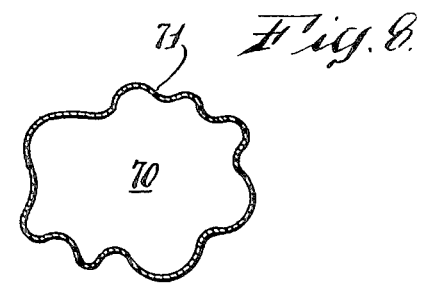
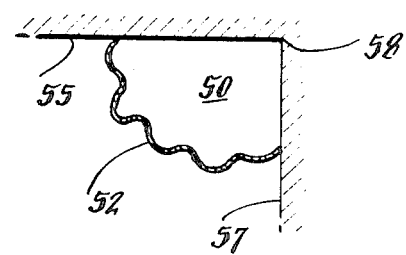

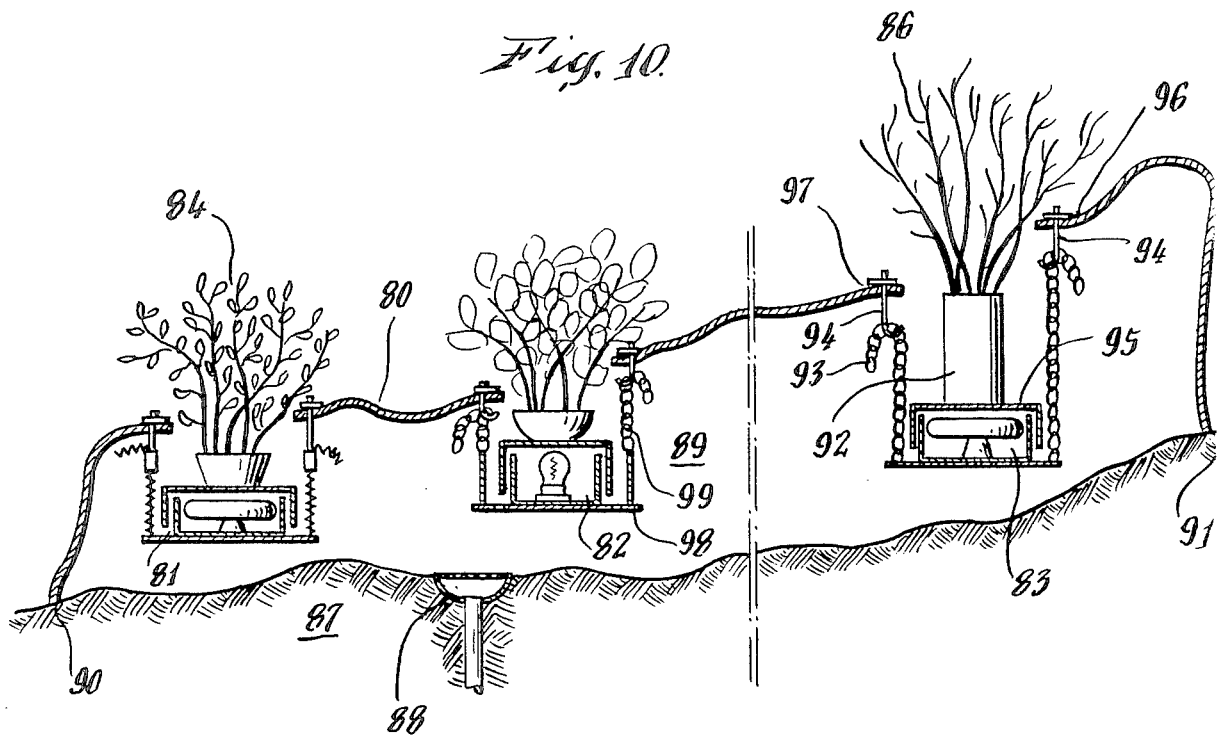

ILLUMINATED ROCK GARDEN

This application is a continuation-in-part of application Ser. No. 889,818 filed 7/24/86 and now U.S. Pat. No. 4,686,611, which is a continuation-in-part of application Ser. No. 697,168 filed 2/1/85, now issued as U.S. Pat. No. 4,626,968 which is a continuation-in-part of application Ser. No. 660,905 filed 10/15/84, now issued as U.S. Pat. No. 4,594,646.

BACKGROUND OF THE INVENTION

The present invention relates to the glare-free lighting of objects having three-dimensional surfaces, such as plants, sculptures and other defined objects. It particularly relates to the illumination of objects intended to be centripetally viewed in the setting of a rock garden.

Conventional methods used to light three-dimensional objects involve the use of spotlights, ceiling lights, track lights and the like, normally beamed at and around the object to be illuminated from a distance, normally of several meters. Such lighting methods and devices have a number of disadvantages.

A primary disadvantage stems from the distance at which conventional lights are mounted from the object to be illuminated. This causes not only loss of lumens, but a scattering of light beyond the confines of the object. It is obvious that, the greater the distance, the more difficult it is to economically direct light with precision at three-dimensional objects, especially objects having irregular configurations. An illustration would be a tall or spindly plant or an irregularly shaped object, in the lighting of which much of the light passes by and through such an object.

Another drawback of such lighting methods lies in the glare produced by ceiling lights and spotlights, which results in discomfort to the eyes of observers.

Lighting devices, such as spotlights, are used indoors and, with appropriate safeguards, outdoors, in the illumination of specific three-dimensional objects. The light from such light sources, illuminating for instance the foliage of plants, normally emanates from one source or from several discrete light sources placed at a distance from the object. The disadvantages of these devices are several. First, the light originating at a single source or even at several sources, positioned at a distance and directed at a plant, illuminates only that facet of the foliage which faces such light sources, i.e. one side of the plant. Also, such light usually shines across and through the plant, which is inefficient; more importantly, the naked light shines directly into the eyes of persons facing the light source. If the illuminated plant is thick or dense enough to prevent light from shining through it in such annoying fashion, it follows that the side of the plant facing away from the light source receives no illumination at all. If, in order to overcome these drawbacks, several light sources are disposed around the object to be illuminated, the equipment cost and operating expenses are correspondingly multiplied. Furthermore, the lighting effect of such devices is not uniform and juxtapositioned persons will be exposed to glare.

The type of outdoor lighting device commonly used, which has reflectors directing light downwardly in a glare-free manner towards the ground is capable of illuminating only flowers or short plants; whereas the present invention does not depend on the height, shape or level of the object to be illuminated. In fact, the devices and systems described herein are particularly effective in lighting trees and plants in a setting resembling a rock garden. The invention makes it possible to display plants and sculptures of different shapes and sizes in a variety of individual or grouped rocks.

It therefore is a principal object of the invention to illuminate three-dimensional objects, such as plants and sculptures indoors and outdoors in a setting resembling rocks and the like in such a manner that the source of light is not directly visible and glare is avoided.

It is another principal object to illuminate plants in a penetrating manner, while enveloping the outer reaches of such plants.

It is another object to minimize the loss and consumption of lumens by placing the light source in close proximity to the object to be illuminated so as to shorten to the absolute practical minimum the path the light has to travel in illuminating the object.

It is still another object of the invention to avoid the scattering of light inherent in other lighting methods.

It is yet another object to provide illuminating systems and devices which are economical and simple to manufacture, install and maintain, and which are highly efficient in operation.

It is still another object to indirectly light three-dimensional objects in a rock garden setting in a novel, decorative and pleasing manner.

The term "source of light" as used herein is intended to include where appropriate a combination of more than one lamp positioned at a lighting hub or arranged in such manner as to function as a central light source. The term "light cone" is intended to include light beams or other upwardly diverging or spreading light rays, whether of circular, oval, rectangular or other configuration. The term "rock" is intended to include boulders, ledges, and other shapes of stones and minerals. The term "ground" is intended to include outdoor and indoor floors and support areas at any level. The term "soil" is intended to refer to dirt, gravel, sand and other growing or support media for plants. The term "mound" is intended to include flowerbeds, inclines, slopes and elevated or contoured areas. The term "lower part" of an object to be illuminated is intended to include flower pots, planters and support structures for natural and artificial plants; also a base, platform or support for sculptures and other display items. The term "rigid sheet" is intended to include self-supporting skins, shells and structures of limited thickness capable of forming hollow articles of manufacture as opposed to solid objects. The term "void space" includes cavities and empty spaces. The term "flexible" is intended to indicate the ability to change angles in response to force, whether by bending, turning or swivelling.

The term "reflective" is defined as at least partially light-reflective. The term "plant" is intended to include flowers, trees and branches, whether natural, preserved, artificial or dried.

The various objects and advantages of the invention will become apparent from the following description and accompanying drawings. While the description and drawings are for illustrative purposes primarily directed to plants, it should be obvious that the devices and systems claimed are equally suitable for and applicable in the illumination of other objects, such as sculptures, antiques, statues, art objects, mineral exhibits, theatrical devices, stage props, museum and show pieces of any nature in a setting resembling a rock or rock garden.

The systems according to the present invention permit lighting large or bulky, three-dimensional objects, such as bushes, in a penetrating manner, while permitting centripetal viewing, including particularly the glare-free viewing by a plurality of juxtapositioned observers, for instance persons grouped around the illuminated object. The light source is disposed proximate to said object and the light passes only through a transparent support element to reach the object. As a result, the light path in many instances is reduced to substantially less than 50 centimeters. In most cases, the light will travel no more than 20-30 centimeters to reach the lower end of the object. This spatial arrangement minimizes electric power requirements by reducing the distance between the light source and the objects to be illuminated to the practical minimum.

The devices described are suitable for indoor and outdoor lighting of natural and artificial plants, sculptures and other display items. In the case of natural plants, and outdoor applications, means for the protection of the light source against water are provided. Flexible and adjustable suspension means ensure the upright position of the objects, irrespective of the shape of the simulated rock containing the device. Accordingly, the invention permits placing a rock or rock group of ground having a level, irregular or sloping surface; in addition, the simulated rock garden itself may be of a sloping nature. In all instances, the axis of the object to be illuminated will be vertical. The eyes of observers are shielded from a direct view of the light source, which is recessed in a void space inside and below the upper surface of the rocks. A plurality of such illuminated objects will, by its light reflections, serve as ambient illumination for an entire rock garden.

Because the light envelops an entire plant from below, it does not produce bright or dark surfaces of the kind typical of spotlights, but illuminates the objects in a uniform manner. Also, as a result, the light reflected from a pluality of such plants or trees in the setting described is free of irritating glare and illuminates an entire rock garden consisting of multiple plant-containing rocks in a unique and beautiful "fairyland" fashion.

SUMMARY OF THE INVENTION

The present invention, which produces novel and superior lighting effects on plants and sculptures in a rock garden setting, has a number of features in common with the patent applications of which it is a continuation. Common features include the illumination of objects by means of light sources disposed directly below and in close proximity to the object to be illuminated. Light from the recessed light source shines upwardly around the object in an enveloping fashion and without glare to observers who are not directly exposed to the light which is visible only by its reflections from the illuminated object. The minimal light path reduces scattering of light, power consumption and lamp size.

Differentiating the present invention from said earlier applications, the same may be characterized as being directed to the illumination of objects placed in rock gardens comprising hollow man-made rocks. Artificial light is generated at a central point by a lighting device which is recessed in each such rock and is disposed below and proximate to the object to be illuminated. At least some of the generated light shines directly upwardly through a transparent member serving as support means for the object to be illuminated and as guard to protect the light source from rain and other water. A flexible and adjustable suspension system ensures the vertical position of the objects to be illuminated. As a result, a rock garden comprising a plurality of artificial rocks may have any configuration and may be placed on ground of any angle without affecting the vertical position of the illuminated objects.

An opening is provided in the skin of each rock above the lighting device, which opening is shaped and dimensioned to receive the lower part of the object to be illuminated and to permit the upward escape of light in the form of an inverted light cone most appropriate to the object and the desired illuminating effect.

BRIEF DESCRIPTION OF DRAWINGS

FIG. 5 is a diagramatic perspective view of a rock system.

FIG. 6 is a diagramatic, perspective view of a rock garden.

FIG. 7 is a diagramatic plan view cross-section of rock garden having a semi-circular bottom configuration.

FIG. 8 is a diagramatic plan view cross-section of a rock garden having a circular bottom configuration.

FIG. 9 is a diagramatic plan view cross-section of a rock garden having a quarter-circular bottom configuration.

FIG. 10 is a diagramatic vertical cross-sectional view of a simulated rock garden.

DETAILED DESCRIPTION OF THE INVENTION AND DRAWINGS

Two preferred embodiments of the invention take the form of a rigid sheet structure resembling a single natural rock and a rigid sheet panel resembling a plurality of grouped rocks. Simulated single rocks may be used to advantage in such settings as gardens, patios or pool areas, whereas grouped rock simulations may be used effectively in such settings as artificial rock gardens, grottos and waterfalls. Display items, as for instance jewelry, may also be lighted in a very effective manner by suspending it above the described opening in a single man-made rock serving as a showcase. Because the artificial rocks according to the present invention can be cast, molded, or sculptured into any desired shape, their realism and versatility make it possible to adapt modular rocks to any desired application. Due to the hollow structure of the rocks, even a panel resembling an entire rock garden is of relatively light weight.

According to a preferred method, the rocks are molded from fiber glass-reinforced polyester resin, but any other material capable of being cast, molded or sculptured into structures having the desired rigidity and strength may be employed. Pigments or other coloring substances are incorporated into the material prior to casting. The hollow rocks which have the desired surface configuration and texture have a skin which need only be thick enough to permit cutting or machining as may be necessary and having strength to support the objects to be illuminated.

Figure 1:
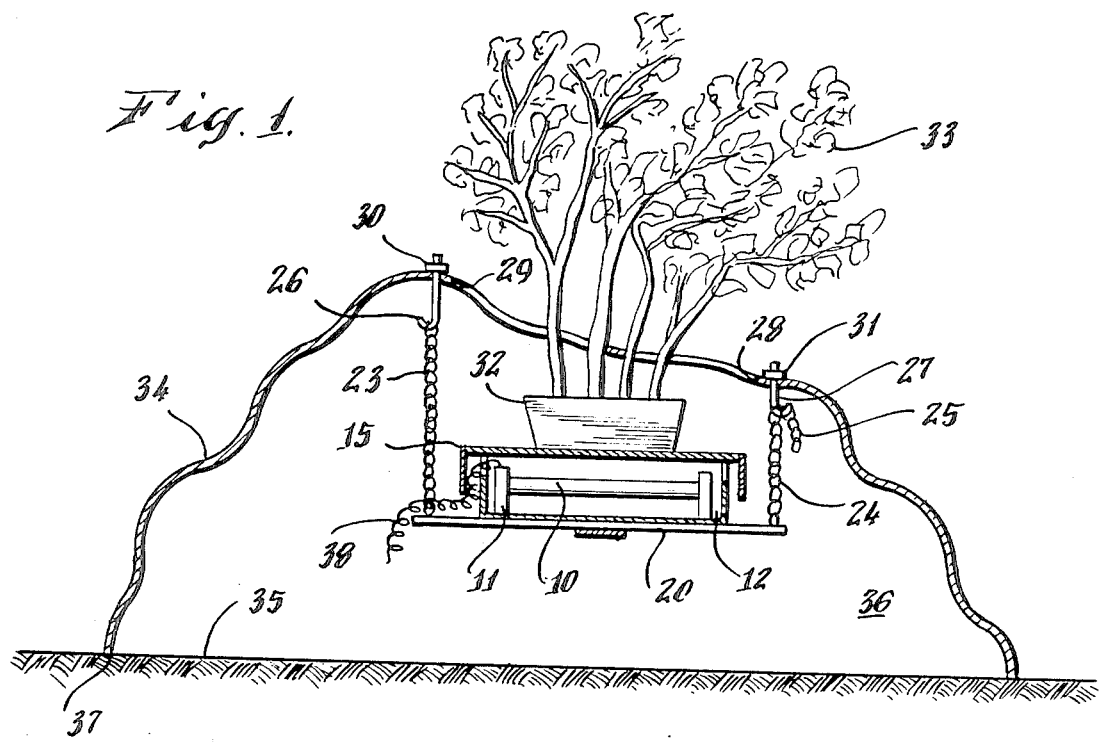
FIG. 1 is a diagramatic cross-section of a rock system.

FIG. 1 is a vertical, diagramatic cross-section of an individual, molded rock. A fluorescent lamp 10 held by fixture 11 is mounted in receptacle 12 which consists of an aluminum box which is open at the top. Lid 15 having vertical peripheral skirts, rests on the upper edges of box 12. Box 12 rests on support 20 which is suspended from skin 34 of the rock by means of hooks 26 and 27 attached to skin 34 by anchoring means 30 and 31 holding chains 23 and 24. Said hooks hold flexible chains 23 and 24 which permit adjusting for different levels in the configuration of skin 34 around the opening for the object and illuminating device. In FIG. 1, extra chain links 25 permit compensating for the difference in the levels of edges 28 and 29 of skin 34. The number of chain links 23 and 24 actually used suspends support 20 horizontally so that the planter 32 of tree 33 also is positioned horizontally on lid 15. The rock shown rests on ground 35 and contains a void space 36. Water falling on the upper part of the object 33 and the lower part 32 will run along the horizontal portion of lid 15 and downwardly along its skirts, eventually falling into void space 36.

Anchoring means 30 and 31 are of any well known type, such as hooks, fastened to skin 34 by means of threaded upper ends and nuts. The flexible suspension means may be in the form of chains as shown, or any other flexible members, such as belts or ropes, the length of which is adjustable. Support means 20 shown in FIGS. 1 and 3 as crossed and joined metal strips, may take any suitable form, including that of an outer container adapted to accommodate the illuminating device. Such outer container, one of which is shown among the support means in FIG. 10, is attached at its upper rim to said flexible suspension means and is provided with water drainage means in or near it bottom.

Skin 34 is given the upper surface configuration, texture and color to resemble the kind of natural rock or mineral to be simulated. Except for indentations, simulated crevices and the like, the rocks made in accordance with the present invention have an overall convex upper configuration, creating a void space 36 between their surface and the ground 35 on which the bottom edges 37 of skin 34 rest. The required waterproof electrical connections (not shown) are advantageously strung in the void space 36, where they are hidden from the view of observers.

The simulated rock shown in FIG. 1 is open at the bottom and has edges 37 adapted to rest on or be anchored in the ground 35, which may be level or sloping. The vertical dimensions of skin 34 therefore determine the position of said rock. Alternatively, the rock according to the present invention may be of one hollow piece, having a bottom which is flat or adapted to rest on ground 35.

Lamp 10 is suitably connected to an electric power source through waterproof wiring 38 conducted in void space 36.

Figure 2:
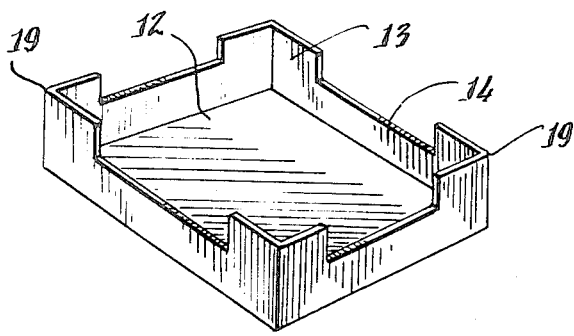
FIG. 2 is a perspective view of the receptacle for the light source.

FIG. 2 is a perspective view of box 12 which, according to a preferred embodiment, has a reflective inside bottom surface. Other inside surfaces of walls 13 may also be made reflective. Walls 13 have cut-outs 14, leaving edges 19 near the corners.

Figure 3:
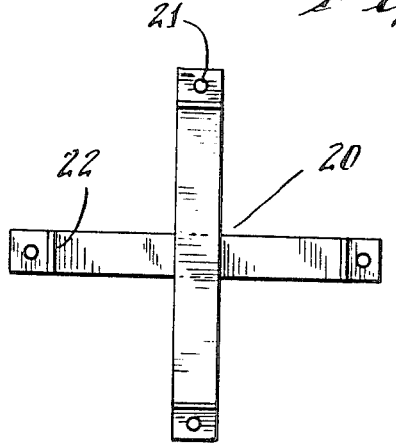
FIG. 3 is a diagramatic top plan view of the support means for the illuminating device.

FIG. 3 is a plan view cross-section of support 20, which may consist of joined metal strips. It is provided with holes 21 for links of the flexible chain suspension means. If desired, spacer means 22 may be provided to hold receptacle 12 in place.

Figure 4:
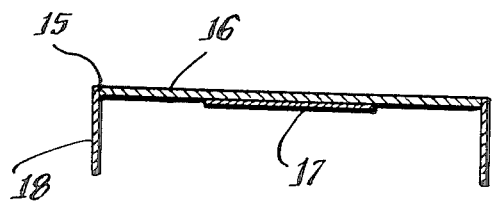
FIG. 4 is a diagramatic cross-sectional view of the watertight lid of the illuminating device.

FIG. 4 is a vertical cross-section of lid 15, comprising upper horizontal member 16 and vertical skirts 18. Sheet-like member 16 which has transparent portions at least around its periphery is joined to skirts 18 in a water-tight manner. At or near the center of the underside of sheet 16, a reflective portion 17 is provided. Sheet 16 is sufficiently strong to support lower part 32 and upper part 33 of the objects to be illuminated. Light from lamp 10 shining upwardly and partially reflected downwardly by reflective portion 17, is re-reflected upwardly by the reflective bottom of receptacle 12; it shines upwardly, passing between lower object part 32 and the edges forming the opening in skin 34, thus maximizing light utilization.

FIG. 5 is a perspective view of a single simulated rock 40 having cut-out or opening 41 near its convex upper part. Anchoring means 43 are attached to the skin 42 around opening 41. Light from the recessed illuminating device shines upward around the lower part 46 and illuminates upper part 44 of the object within its inverted light cone. Water falling through opening 41 escapes through drain 45.

FIG. 6 shows a simulated rock grouping 50 comprising a plurality of rocks 56, some of which have openings 51 capable of receiving the lower part of the object to be illuminated. Lower edges 52 of rock group 50 rests on ground 53. Vertically extending edges 54 rest against walls 55 and 57, coming to a point along corner 58 formed by walls 55 and 57. The rock group 50 is capable of accommodating a plurality of objects to be illuminated which may include trees, flowers and plants as well as sculptures and statuettes.

FIG. 7 is a diagramatic cross-section of the bottom edge of a group of rocks 60 having a semi-circular bottom configuration 61 and edges 62 and 63 attached to vertical surface 64.

FIG. 8 is a diagramatic cross-section of the bottom of free-standing rock group 70 having a circular bottom edge 71. The simulated grouping of rocks 70 may for instance have a conical or other convex shape and the objects placed in the individual simulated rocks may be centripetally viewed by observers grouped around rock formation 70 in a circle.

FIG. 9 is a diagramatic cross-section of the bottom edge of rock grouping 50 having a quarter-circular edge 52 contacting vertical walls 55 and 57 meeting at corner 58.

FIG. 10 is a diagramatic vertical cross-section of a simulated rock garden 80, manufactured according to the present invention. Depending on its size, it may be cast in one piece or it may comprise two or more of the panels described, joined in suitable fashion. The simulated rock garden 80 shows three illuminating devices 81, 82 and 83 of a desired total number of such devices which may contain fluorescent, incandescent or other light sources. The light sources are chosen to illuminate upper parts 84, 85 and 86 of the objects to be illuminated. FIG. 10 illustrates lower parts of these objects in the form a flower pot, a bowl and a vase, such as vase 92, but it should be understood that any container may be used and that the object to be illuminated may be a sculpture having as its lower part a base or platform resting on the horizontal lid 95 having transparent peripheral portions.

The opening between edges 96 and 97 permit the insertion of vase 92, the upper rim of which may, if desired, protrude above said opening. Vase 92 may be round or rectangular and the opening between edges 96 and 97 may assume a corresponding rounded i.e. circular or oval, or a rectangular shape. The level of the illuminating device 83 and lid 95 is adjusted through said vertical suspension means, so that the light shining upwardly in the form of an inverted light cone diverges in such manner as to envelop the upper reaches of object 86. Light source 83 is not visible to observers and the only light visible is that reflected from the illuminated part of the object.

One of the support means shown has the embodiment of outer container 98, which has walls and a perforated bottom for drainage. Container 98 is suspended from its upper rim by flexible chain means 99 having a sufficient number of links to permit adjustment for variations in the levels of the edges surrounding a specific opening. Thus, the difference in the levels of the edges 96 and 97 is compensated by the use, for instance, of the extra chain links 93. The flexibility of this type of suspension means ensures the horizontal position of object bearing lids 95, irrespective of the configuration of the surfaces of rock garden 80.

Water falling on the objects and illuminating devices reaches the bottom of void space 89 and is drained through drainage means 88. Ground 87 may have a natural slope as shown in FIG. 10. This slope may be accentuated by the shape of the rock garden which has lower edges 90 and 91 resting on or secured in ground 87.

In the drawings described above, a single light source is shown for purposes of illustration. It should be obvious, however, that for larger objects such as trees, a central, multiple-lamp light source may be provided under the container holding such tree. In such an event the dimensions of the light source will increase, as will the size of the opening through which such planter is inserted. However, even in the case of more bulky lighting devices, the distance between the light source and the lower part of the illuminated object will be small and will be substantially less than 50 centimeters, such as for instance 20 to 30 centimeters, or less.

Other applications, embodiments and configurations of the present invention may be devised by persons skilled in the art without deviating from the principal features described herein. These and any modifications covered by the doctrine of equivalents are intended to be included within the scope of the appended claims.

What is claimed is:

1. A system for the glare-free illumination of three-dimensional objects comprising:
   a rigid sheet structure comprising material selected from the group which includes sculptured, molded and cast concrete, fiber glass-reinforced concrete, polymeric substances and fiber glass-reinforced polymeric substances, having an upper convex shape, having the surface appearance and configuration of a natural rock, having an upper opening capable of accommodating the lower part of an object to be illuminated,
   void space below the surface of said structure,
   an illuminating device disposed in free-hanging suspension in said void space below the opening in said structure, said device comprising:
   a receptacle having an upper opening, a light source disposed in said receptacle, a watertight lid covering the opening in said receptacle adapted to support an object to be illuminated, said lid having transparent portions horizontally extending substantially around the lower part of said object, support means for said receptacle, including flexible vertically extending suspension means adapted to position said receptacle below the opening in said structure, anchoring means to fasten said suspension means to said structure, and
   a three-dimensional object to be illuminated, having an upper part to be illuminated and a lower part capable of passing through the opening in said structure so that the lower part of said object supported by said lid is suspended in said void space below said opening and the upper part of the object to be illuminated protrudes above said opening, and
   wherein, irrespective of the configuration of the upper surface of said structure surrounding said opening, the flexible suspension means maintains said receptacle and lid in a substantially horizontal position in said void space,
   wherein light from said light source shines upwardly through the transparent portions of said lid, so as to envelop the upper part of said object from substantially all sides, said light not being directly visible to observers and being indirectly visible without glare by its reflections from said object, and
   wherein water falling on said object runs along the surface of the watertight lid and drains downwardly into said void space without contacting electrical components of the light source.

2. The system according to claim 1, wherein said sheet structure is open at the bottom and terminates in peripheral lower edges adapted to rest on the ground.

3. The system according to claim 2, wherein said receptacle for the light source has a reflective inside surface.

4. The system according to claim 1, wherein said lid has a reflective underside portion positioned central to said transparent portions.

5. The system according to claim 1, wherein the length of said vertically extending suspension means is adjustable.

6. The system according to claim 1, having water draining means disposed below said illuminating device.

7. An illuminated rock garden comprising:
   a rigid sheet panel comprising material selected from the group which includes sculptured, molded and cast concrete, fiber glass-reinforced concrete, polymeric substances and fiberglass reinforced polymeric substances, having the surface appearance and configuration of a plurality of grouped natural rocks, shaped so as to contain a void space below its surface, having a plurality of openings in its surface, each opening being capable of accommodating the lower part of at least one object to be illuminated,
   a plurality of illuminating devices disposed in free-hanging suspension in said void space below said openings, each such device comprising:
   a receptacle having an upper opening, a light source disposed in said receptacle, a watertight lid covering the opening in said receptacle adapted to support an object to be illuminated, said lid having transparent portions horizontally extending substantially around the lower part of said object, support means for said receptacle, including flexible, vertically extending suspension means adapted to position said receptacle below its corresponding opening, anchoring means to fasten said suspension means to said panel, and
   a plurality of objects to be illuminated, each object having an upper part to be illuminated and a lower part capable of passing through one of said openings, so that the lower part of said objects resting on said lids is suspended in said void space below its corresponding opening in said panel and the upper part of the object protrudes above said opening, and wherein, irrespective of the configuration of the upper surface of said panel surrounding such opening, the flexible suspension means maintain said receptacles and lids in a substantially horizontal position in said void space, wherein light from said light source shines upwardly through the transparent portions of said lids, so as to envelop the upper part of said objects from substantially all sides, said light not being directly visible to observers and being indirectly visible without glare by its reflections from said objects, and wherein water falling on said objects runs along the surface of the watertight lids and drains downwardly into said void space without contacting electrical components of the light source.

8. The rock garden according to claim 7, wherein said rigid sheet panel has peripheral portions extending downwardly at an angle from its central portion, so as to form an inverted box open at the bottom and wherein at least some of the edges of said peripheral portions rest on the ground and the central portion of said panel is raised above the ground.

9. The rock garden according to claim 8, wherein said peripheral portions are adapted to rest on an incline.

10. The rock garden according to claim 7, wherein said rigid sheet panel has lower peripheral portions adapted to rest on the ground and upper peripheral portions adapted to rest against a wall above the ground.

11. The rock garden of claim 7, wherein said rigid sheet panel forms a free-standing three-dimensional structure positioned on the ground, so that all of its rock-resembling surfaces are centripetally visible.

12. The rock garden according to claim 7, having water draining means disposed below said illuminating devices.

13. The rock garden according to claim 7, comprising a plurality of rigid sheet structures according to claim 1.

14. The rock garden according to claim 7, wherein said illuminating devices are connected to an electric power source by means of waterproof wiring disposed in said void space and not visible to observers.

* * * * *